Patented Jan. 24, 1933

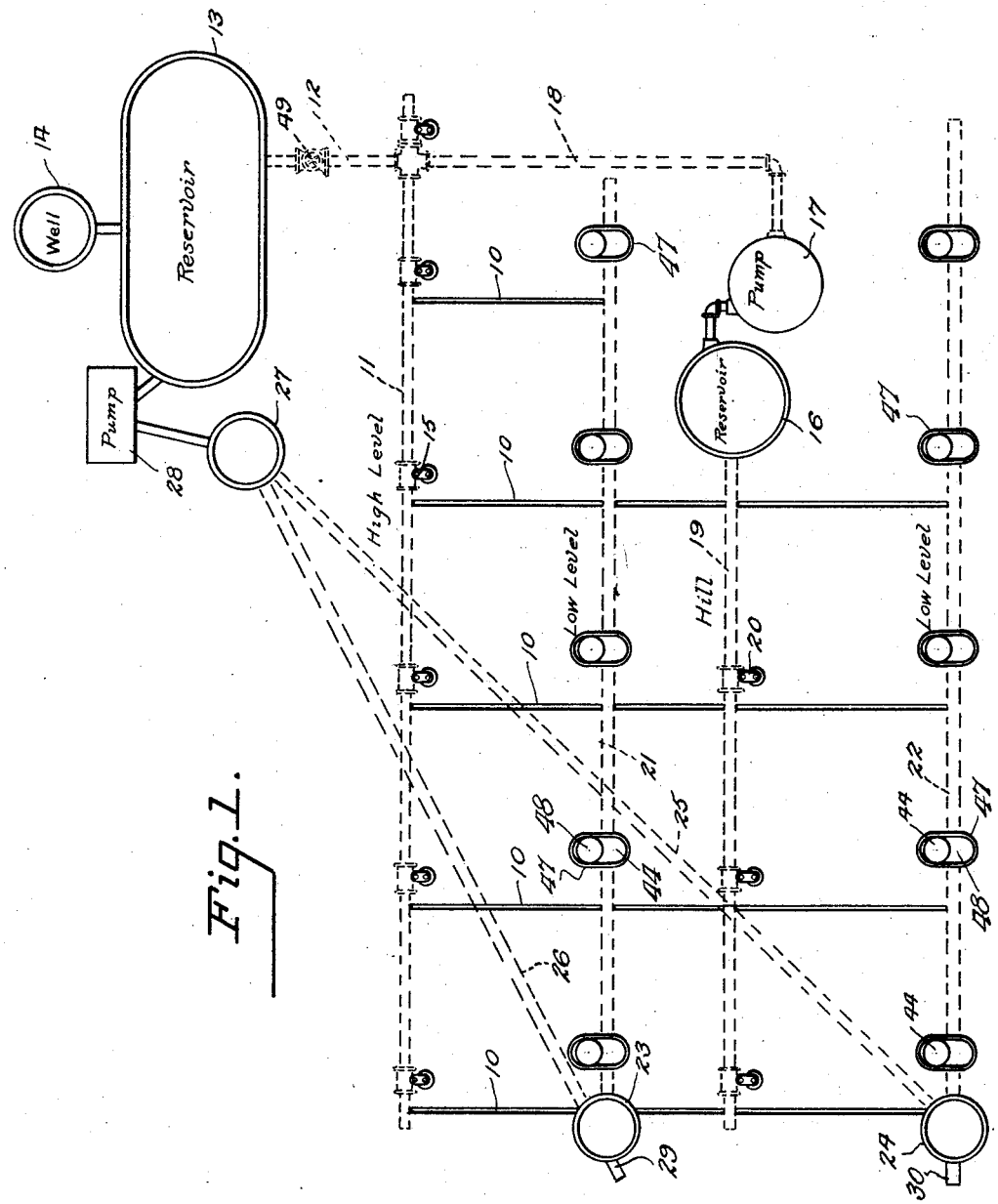

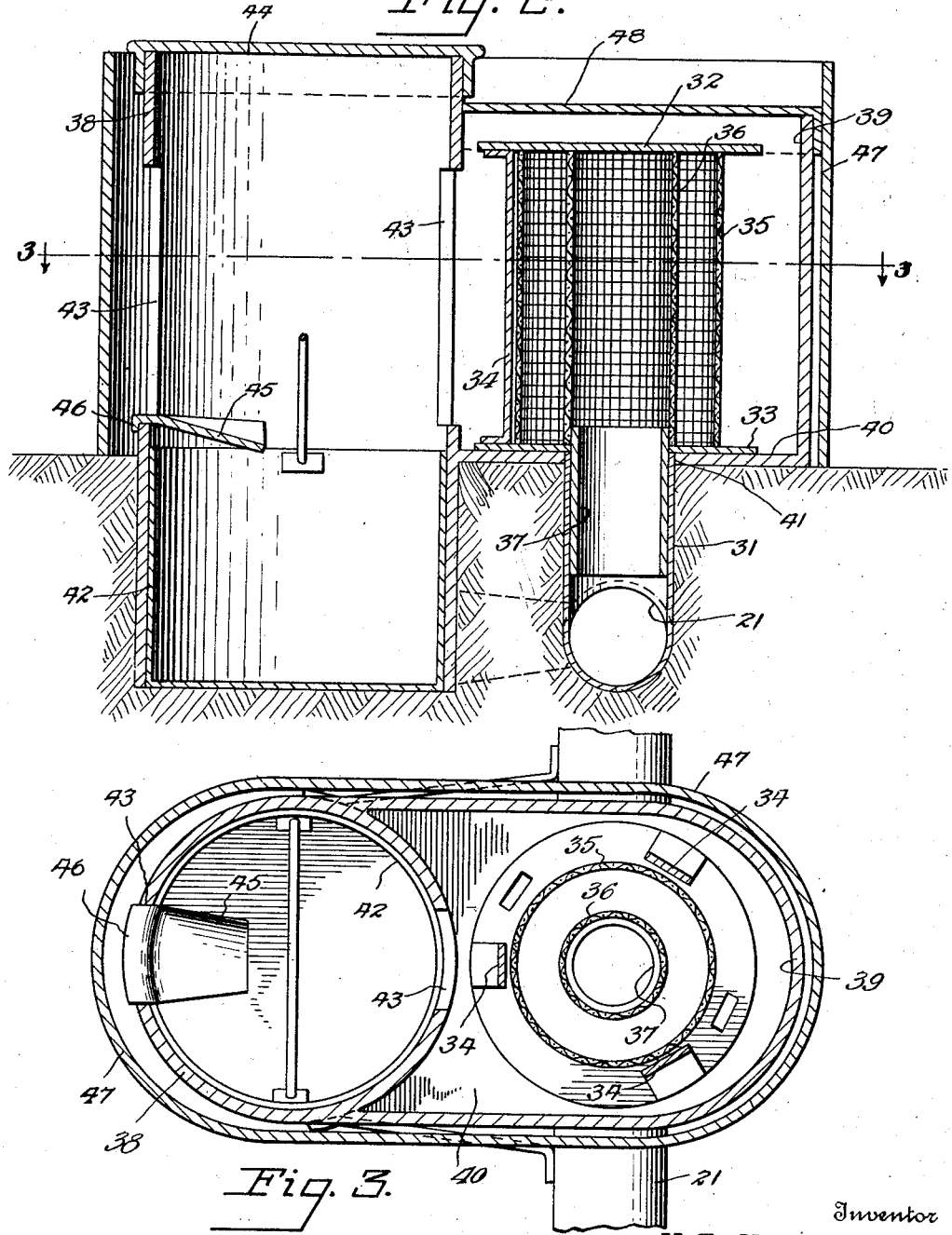

1,895,324

UNITED STATES PATENT OFFICE

NATHAN A. HEACOCK, OF DECATUR, ILLINOIS

IRRIGATION AND DRAINAGE SYSTEM

Application filed February 13, 1932. Serial No. 592,820.

This invention relates to irrigating and drainage systems particularly applicable to the raising of crops in which it is necessary to provide means for controlling the period during which water may be kept on the land and controlling the depth thereof.

An object of the invention is to provide a system of supply and drain pipes and apparatus to be used in connection therewith to compensate for any inequalities in the land surface so that hills as well as the levels and hollows may be adequately watered.

Another object is to provide novel means whereby the inlet of sediment into the drain pipes will be minimized and whatever sediment may accumulate may be easily and quickly removed.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention.

In the accompanying drawings forming part of this specification,

Figure 1 is a plan view of an irrigating system constructed in accordance with my invention, Figure 2 is a longitudinal section through one of the valve devices for the drain pipes, and Figure 3 is a cross section taken on the line 3—3 of Figure 2.

Referring now to the drawings in which like characters of reference designate similar parts, and referring especially to Figure 1, the field to be irrigated is shown inclined from a high lever to a low lever and contiguous to the latter there is a hill from which the field again slopes to a low level, these various contours being designated by appropriate legends.

This field is laid off into relatively small sections by means of dikes 10 which are disposed in approximately parallel relation and which extend in the direction of the incline of the land.

A distributing pipe 11 is disposed across the upper end of the field and is supported in any suitable manner. This pipe is connected by a branch pipe 12 to a reservoir 13 of any suitable capacity, which in turn is connected to any suitable source of water, such as a well 14. The pipes 11 and 12 are preferably made of tile laid below ground. At intervals the distributing pipe 11 is provided with laterally extending outlets 15 which rise above ground and may be of any preferred type of irrigating valve adapted to discharge out on the ground from any suitable height. The irrigating valves 15 are disposed between the dikes so as to water the areas defined by the dikes.

It will be observed that the high point or hill of the field is provided with a reservoir 16 which is of any suitable capacity and is supplied by a lift pump 17 which elevates water from the main reservoir 13 through a supply pipe 18 which may be a continuation of the pipe 12 or not as desired. The reservoir 16 discharges into a distributing pipe 19 laid along under the ground and equipped with irrigating valves 20 between the dikes as heretofore described.

At the low levels of the field there are disposed drain pipes 21 and 22 which preferably extend in parallel relation to the supply pipes if the contours of the field will permit, and these drain pipes each discharge into corresponding receiving sumps or reservoirs, 23 and 24. These reservoirs are in turn connected by pipes 25 and 26 to a common receiving reservoir 27. The water received in the reservoir 27 may be pumped or otherwise carried back into the reservoir 13 or otherwise removed, in the present embodiment of the invention, a pump 28 being illustrated to return the drainage back to the main reservoir 13. If desired the receiving reservoir 23 and 24 may be equipped with drain pipes 29 and 30.

Each drain pipe is connected at intervals to a plurality of stand pipes 31 that rise to the surface of the ground as best shown in Figure 2. It is desirable that trash and sediment be prevented in as far as possible from entering the stand pipes and clogging the drain pipes, and to accomplish this result, I provide each stand pipe with a screen which is built into a combined housing and catch basin around which is disposed the controlling drum valve for regulating the drainage as will now be described.

Referring especially to Figures 2 and 3 it will be seen that the screen element comprises a pair of disks 32 and 33 which are spaced by a plurality of risers 34. A cylindrical screen 35 is connected at the top and bottom to the disks within the enclosure of the risers and, concentrically mounted within the outer screen, there is an inner screen 36 which also is preferably connected at the top and bottom to both disks. The screens may be of like mesh or of different mesh as desired. A pipe 37 enters the bottom disk 33 at the center and is of sufficient diameter to nicely enter into the stand pipe 31 and removably mount the screen element on the stand pipe.

A cylindrical housing 38 is provided on one side with an elongated extension 39, the bottom 40 of which is provided with an opening 41 to nicely receive the stand pipe 31, the housing 38 being adapted to extend down into the ground at the lower end considerably beyond the bottom 40 of the extension, said bottom being supported upon the ground so that it is at the ground level while the lower end of the cylindrical housing 38 extends into the earth to about the level of the drain pipe as shown. The extension 39 receives and houses the screen element while the earth which may enter with the water when the field is being drained, gravitates to the bottom of the housing 38 wherein is located a bucket 42 to receive the sediment. Ports 43 are arranged in the sides of the cylindrical housing to permit the water to enter the housing and pass therefrom through the screen element before entering the drain pipe. A flanged cover 44 closes the top of the cylindrical housing and affords entry to the housing to remove the bucket as often as necessary. A trough 45 may be secured to the bottom edge of the entrance port 43 by means of bending an edge of the trough 45 over the side wall of the housing, as shown at 46.

A drum valve 47, open at the top and bottom, is provided and is preferably substantially oval in contour and of sufficient size to loosely fit down over the housing 38 and extension 39 thereof and be supported at the bottom upon the ground as shown. When the valve is in operative position, shown in Figure 2, the field may be flooded to a depth equal to the height of the valve, if desired, or to any less depth. When it is desired to drain the field it is simply necessary to remove the drum valve 47 whereupon the water enters the port 43 of the housing and fills the bucket 42 then passes through the port 43 into the extension 39 of the housing and through the outer screen 35 and inner screen 36 into the stand pipe 31, thence into the drain pipe. During this course of the water the sediment will collect in the bucket 42 while trash will be prevented by the screen from entering the drain pipe.

The extension 39 of the housing is provided with a flanged cover 48 which affords access to the screen element so that when the latter becomes clogged with débris the screen element may be lifted bodily out of the extension and cleaned, and the accumulated trash in the extension easily removed through the open top of the extension.

In certain seasons of the year it is desirable to have the land dry, and in this case the main reservoir 13 may be drained, or the supply therefrom to the distributing pipes may be cut off by means of a valve 49 located in the pipe 12. In this case the natural drainage from the land will be received in the sumps or reservoirs 23 and 24 and carried to the reservoir 27 or let out through the outlet pipes 29 and 30.

When it is desired to flood the land the valve 49 is opened permitting the water to flow from the reservoir 13 into the distributor pipe 11 and also to the pump 17 on the high point of the land where it is discharged into the reservoir 16 and escapes into the distributing pipe 19. From the distributing pipes the water flows through the valve controlled hydrants or irrigating valves 15 and 20 to the small sections defined by the dikes 10, it being, of course, understood that the irrigating valves are controlled to flood only the particular small areas desired to be watered. As long as the drum valves 47 are kept in place to close the ports 43 in the various drain pipe housings, the water will gradually rise between the dikes so that the land will be flooded and this flooded condition may be kept as long as desired. The height of the water may be increased or decreased at any time by lifting and replacing the drum valves and thus may be accurately controlled.

When it is desired to drain the land it is only necessary to lift one or more of the drum valves, whereupon one or more of the sections between the dikes will be drained.

From the above description it is thought that the construction and operation of my invention will be fully understood without further explanation.

What is claimed is:

1. In an irrigating system, a drain pipe, a housing having one end adapted to extend below the ground level and having a lateral extension at the ground level, ports in the housing above the ground level, a vessel for sediment removably disposed in the bottom of the housing, a screen element housed within said extension over the open end of the drain pipe, and a valve encircling the housing and extension above the ground level and normally closing said ports.

2. In an irrigating system, a drain pipe, a housing disposed near the drain pipe and having a lateral extension disposed above the drain pipe, there being inlet and outlet ports in the housing, a sediment holder in the housing below the ports, a screen element in the extension communicating with the drain pipe, and a valve for closing said inlet port.

3. In an irrigating system, a drain pipe, a housing having a lateral extension disposed above the drain pipe, a catch vessel in the housing disposed below the level of the extension, a screen element in the extension having a tube extending through the bottom of the extension into said drain pipe, there being inlet and outlet ports in the housing, said outlet port establishing communication between the housing and extension and a drum valve encircling the housing and extension and being adapted to be supported normally upon the ground to seal said inlet port.

4. In an irrigating system, a drain pipe protector comprising a housing having one end adapted to extend below the ground level and having a lateral extension at the ground level, a vessel for sediment removably disposed at the bottom of the housing, a screen element housed within said extension and having a tubular outlet pipe adapted to project into the drain pipe, means for closing the top of the housing and the extension for affording access to the screen element and to the vessel, there being ports in the housing, and a valve for closing one of said ports to prevent passage of water into the housing.

In testimony whereof I affix my signature.

NATHAN A. HEACOCK. [L. S.].